(12) United States Patent
Edmiston

(10) Patent No.: US 8,217,131 B2
(45) Date of Patent: Jul. 10, 2012

(54) METHOD FOR EXTRACTING A METAL PARTICULATE FROM AN AQUEOUS SOLUTION USING A SOL-GEL DERIVED SORBENT

(75) Inventor: Paul L Edmiston, Wooster, OH (US)

(73) Assignee: ABS Materials, Inc., Wooster, OH (US)

( * ) Notice: Subject to any disclaimer, the term of this patent is extended or adjusted under 35 U.S.C. 154(b) by 0 days.

(21) Appl. No.: 13/029,771

(22) Filed: Feb. 17, 2011

(65) Prior Publication Data

US 2011/0132845 A1    Jun. 9, 2011

(51) Int. Cl.
*C08G 77/60* (2006.01)

(52) U.S. Cl. .......................................... 528/35; 210/660
(58) Field of Classification Search .................... 528/35; 210/660
See application file for complete search history.

(56) References Cited

OTHER PUBLICATIONS

Burleigh (Environ. Sci. Technol. 36 (2002) 2515-2518).*

* cited by examiner

*Primary Examiner* — Kuo-Liang Peng
(74) *Attorney, Agent, or Firm* — Arent Fox LLP

(57) ABSTRACT

Disclosed is a method for extracting metal particulates for an aqueous solution using a sol-gel derived sorbent.

17 Claims, No Drawings

METHOD FOR EXTRACTING A METAL PARTICULATE FROM AN AQUEOUS SOLUTION USING A SOL-GEL DERIVED SORBENT

STATEMENT REGARDING FEDERALLY FUNDED RESEARCH OR DEVELOPMENT

This invention was made with Government support under National Science Foundation-Small Business Innovation Research Grant No. 1013263.

CROSS REFERENCE TO RELATED APPLICATIONS

This application claims the benefit of U.S. patent application Ser. No. 12/819,940, filed Jun. 21, 2010, which is a divisional of U.S. patent application Ser. No. 11/537,944, filed Oct. 2, 2006 (now U.S. Pat. No. 7,790,830).

TECHNICAL FIELD

The present invention relates generally to the chemical arts. More particularly, the invention relates to method for extracting a metal particulate from an aqueous solution using a sol-gel derived sorbent.

BACKGROUND OF THE INVENTION

The contamination of soil and water sources with toxic metals has become a major environmental concern in many parts of the world due to rapid industrialization, increased urbanization, modern agricultural practices, and inappropriate waste disposal methods. Unlike organic compounds, toxic metals are not degradable in the environment and can persist in soils and water sources for decades or even centuries. The contamination of soils and water sources with metals can have long-term environmental and health implications.

It is desirable to apply remediation approaches to polluted soils and water sources, which can reduce the risk of metal contamination. The excavation and disposal of soil, for example, is no longer considered to be a permanent solution. The demand for soil and water treatment techniques is consequently growing and the development of new low-cost, efficient, and environmentally-friendly remediation technologies has become a research interest in environmental science and technology.

SUMMARY OF THE INVENTION

Now there has been discovered a novel method for extracting a metal particulate from an aqueous solution. The method includes the steps of contacting a sorbate ligand with the aqueous solution containing the metal particulate to form a metal particulate-sorbate ligand complex and contacting a sol-gel derived sorbent with the aqueous solution containing the metal particulate-sorbate ligand complex under conditions effective to cause the sol-gel derived sorbent to sorb the metal particulate-sorbate ligand complex.

In some embodiments, the sorbate ligand has a log $K_{ow}$ of at least about −0.3. Representative sorbate ligands include 4-acyl-pyrazol-5-olate, β-diketones, 8-sulfonamidoquinoline 1-8-bis(octanesulfonamido)-naphthalene, 2-hydroxy-5nonylbenzophenone, thenoyltrifluoroacetone, cupferron, ketoxime, dicyclohexano-18-crown-6, 1,4,8,11-tetrathiacyclotetradecane, and 5-nonylsalicylaldoxime), bathohenanthroline and dithizone.

In some embodiments, the sol-gel derived sorbent is swellable to at least 1.5 times its volume. And in some embodiments, sol-gel derived sorbent is an aromatically-bridged, organosiloxane sol-gel derived composition, containing a plurality of alkylsiloxy substituents. In some embodiments, the trialkoxysilane is a bis(trialkoxysilylalkyl) benzene. Representative bis(trialkoxysilylalkyl)benzenes include 1,4-bis(trimethoxysilylmethyl)benzene and bis(triethoxysilylethyl) benzene.

In some embodiments, the alkylsiloxy substituents correspond to the formula:

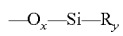

where R is independently a hydrocarbon containing up to about 30 carbons, x is 1 or 2, y is 2 or 3 and the total of x and y is 4. And in some embodiments, the alklysiloxy substituents include at least one heteroatom selected from sulfur, oxygen, nitrogen, phosphorous or halogen atom or combinations thereof.

In some embodiments the metal particulate is arsenic, cadmium, chromium, cobalt, copper, nickel, lead, manganese, tin, thallium, mercury or iron.

Some embodiments include adding a supplemental sorbate to the sol-gel derived sorbent either prior to or during the contacting of sol-gel derived sorbent with the metal particulate-sorbate ligand complex. Representative supplemental sorbates include tetrachloroethylene, ethanol, methanol, acetone, methyl acetate, ethyl acetate, and hexane.

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

Unless otherwise defined, all technical terms used herein have the same meaning as commonly understood by one of ordinary skill in the art to which the present invention pertains.

As used herein, "sorb" means to take up whether by adsorption, absorption, or a combination thereof.

As used herein, "sorbate" refers to a composition taken up by the sol-gel derived sorbent of the present invention, whether by adsorption, absorption, or a combination thereof The inventive method is of particular use with ligand sorbates bound to metal particulates, where the sorbates have a log $K_{ow}$>−0.3

As used herein a ligand is a molecule that makes one or more ionic or coordinate covalent bonds with a metal particulate.

As used herein, "swellable" means increases to at least 1.5 times its volume, when dry, if placed in excess acetone.

In accordance with the invention, there has been discovered a novel method for extracting a metal particulate from an aqueous solution, the method comprising the steps of contacting a sorbate ligand with the aqueous solution containing the metal particulate to form a metal particulate-sorbate ligand complex and contacting a sol-gel derived sorbent with the aqueous solution containing the metal-sorbate ligand complex under conditions effective to cause the a sol-gel derived sorbent to sorb the metal-sorbate ligand complex.

It is an advantage of the invention, that it can be used to extract a large number of metal particulates, including toxic metal particulates, from aqueous solutions. For example, the method is of use in extracting metal particulates in the form of metal particles, powders, flakes, and the like. It is of particular use in extracting metal particulates that exists in a relatively small form (e.g., less than about 1 mm in diameter).

Representative metal particulates include, without limitation, heavy metal particulates, such as arsenic, cadmium, chromium, cobalt, copper, nickel, lead, manganese, tin, thallium and mercury. The method is also of use with iron (e.g., ferrous iron).

Any material that is effective in chelating the metal particulate to be extracted and is a sorbate can be used as a sorbate ligand in the inventive method. In some embodiments, the affinity between the sorbate ligand and the metal is such that the equilibrium constant (affinity constant at a certain pH, beta) is greater than 100 and the sorbate ligands have a log $K_{ow} > -0.3$.

Representative ligands, include, but are not limited to: 4-acyl-pyrazol-5-olate, β-diketones, 8-sulfonamidoquinoline, 1-8-bis (octanesulfonamido)-naphthalene, 2-hydroxy-5nonyl-benzophenone, thenoyltrifluoroacetone, cupferron, ketoxime, dicyclohexano-18-crown-6, 1, 4, 8, 11-tetrathiacyclotetradecane, and 5-nonylsalicylaldoxime). Other examples of ligands are disclosed in John H. Montgomery, *Groundwater Chemicals* (CRC Press, 4th Ed., Boca Raton, Fla.), which is herein incorporated by reference.

Sorbate ligands with large non-polar groups, such as bathohenanthroline are preferred. For example, in those embodiments where the metal particulate is ferrous iron, a suitable sorbate ligand is bathohenanthroline and in those embodiments where the metal particulate is the mercuous ion, a suitable ligand is dithizone.

In some embodiments, a supplemental sorbate is mixed with the sorbate ligand, either before or while the sorbate ligand contacts the sol-gel derived sorbent, in order to enhance the swelling of the sol-gel derived sorbent. Suitable supplemental sorbates typically have a log $K_{ow} > 0.3$. Representative supplemental sorbates include tetrachloroethylene, ethanol, methanol, acetone, methyl acetate, ethyl acetate, and hexane.

In some embodiments, the sol-gel derived sorbent is swellable to at least 1.5 times its volume, when dry, in acetone. Preferred sol-gel derived sorbents are swellable to at least two times their original volume, more preferably at least five times their original volume, and in some embodiments up to about eight to ten times their original volume in a sorbate. The swelling of the sol-gel derived sorbent and the sorption of the sorbate is driven by the release of stored tensile force rather than by chemical reaction.

And in some embodiments, the sol-gel derived sorbent is formed of an aromatically-bridged, organosiloxane, sol-gel derived sorbent containing a plurality of alkylsiloxy substituents. In such embodiments, the sot-gel derived sorbent contains a plurality of flexibly tethered and interconnected organosiloxane particles having diameters on the nanometer scale. The organosiloxane nanoparticles form a disorganized porous matrix defined by a plurality of aromatically cross-linked organosiloxanes that create a porous structure.

The porous, aromatically-bridged, organosiloxane sol-gel derived sorbents contain a plurality of polysiloxanes that include an aromatic bridging group flexibly linking the silicon atoms of the polysiloxanes. Such organosiloxane nanoparticles have a multilayer configuration comprising a hydrophilic inner layer and a hydrophobic, aromatic-rich outer layer.

The sol-gel derived sorbents are formed of a sol-gel derived sorbent obtained using a sol-gel reaction beginning with trialkoxysilanes containing an aromatic bridging group. Suitable trialkoxysilanes include, without limitation, trialkoxysilanes corresponding to the formula:

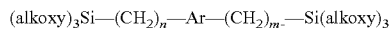

wherein n and m are individually an integer from 1 to 8, Ar is a single-, fused-, or poly-aromatic ring, and each alkoxy is independently a $C_1$ to $C_5$ alkoxy. Bis(trialkoxysilylalkyl)benzenes are preferred and include 1,4-bis(trimethoxysilylmethyl)benzene (BTB), bis(triethoxysilylethyl)benzene (BTEB), and mixtures thereof, with bis(triethoxysilylethyl) benzene being most preferred.

The trialkoxysilanes are preferably present in the reaction medium at between about 0.25M and about 1M, more preferably between about 0.4M and about 0.8M, most preferably between about 0.4M and about 0.6M.

A catalytic solution comprising a stoichiometric amount of water and a catalyst can be rapidly added to the reaction medium to catalyze the hydrolysis and condensation of the trialkoxysilanes. Conditions for sol-gel reactions are well-known in the art and include the use of acid or base catalysts in appropriate solvents. Preferred conditions are those that contain a base catalyst in any suitable solvent. Exemplary base catalysts include, without limitation, tetrabutyl ammonium fluoride ("TBAF"), 1,5-diazabicyclo[4.3.0]non-5-ene ("DBN"), and alkylamines (e.g., propyl amine), of which TBAF is preferred. Suitable solvents for use with the base catalysts include, without limitation, tetrahydrofuran ("THF"), acetone, dichloromethane/THF mixtures containing at least 15% by vol. THF, and THF/acetonitrile mixtures containing at least 50% by vol. THF. Of these exemplary solvents, THF is preferred.

As noted above, acid catalysts can be used to form swellable sol-gels, although acid catalysts are less preferred. Exemplary acid catalysts include, without limitation, any strong acid such as hydrochloric acid, phosphoric acid, sulfuric acid and the like. Suitable solvents for use with the acid catalysts include those identified above for use with base catalysts.

After gellation, the material is preferably aged for an amount of time suitable to induce syneresis, which is the shrinkage of the gel that accompanies solvent evaporation. The aging drives off much, but not necessarily all, of the solvent. While aging times vary depending upon the catalyst and solvent used to form the gel, aging is typically carried out for about 15 minutes up to about 7 days, preferably from about 1 hour up to about 4 days. Aging is carried out at room temperature or elevated temperature (i.e., from about 18 C up to about 60 C), either in open atmosphere, under reduced pressure, or in a container or oven.

Solvent and catalyst extraction (i.e., rinsing) is carried out during or after the aging process. Preferred materials for extraction include, without limitation, any organic solvent of medium polarity; including, without limitation, THF, acetone, ethanol, and acetonitrile, either alone or in combination.

After rinsing, the sol-gel is characterized by the presence of residual silanols. The silanol groups allow for derivatization of the gel using any reagent that includes both one or more silanol-reactive groups and one or more non-reactive alkyl groups. The derivatization process results in the end-capping of the silanol-terminated polymers present within the sol-gel with alkylsiloxy groups having the formula:

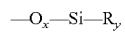

where each R is independently an aliphatic or non-aliphatic hydrocarbon containing up to about 30 carbons, with or without one or more hereto atoms (e.g., sulfur, oxygen, nitrogen, phosphorous, and halogen atoms), including straight-chain hydrocarbons, branched-chain hydrocarbons, cyclic hydrocarbons, and aromatic hydrocarbons, x is 1 or 2, y is 2 or 3 and the total of x and y is 4.

One suitable class of derivatization reagents includes halosilane reagents that contain at least one halogen group and at least one alkyl group R, as defined above. The halogen group can be any halogen, preferably Cl, Fl, I, or Br. Preferred halosilanes or dihalosilanes include, without limitation, chlorosilanes, dichlorosilanes, fluorosilanes, difluorosilanes, bromosilanes, dibromosilanes, iodosilanes, and di-iodosilanes. Exemplary halosilanes suitable for use as derivatization reagents include, without limitation, cynanopropyldimethylchlorosilane, phenyldimethylchlorosilane, chloromethyldimethylchlorosilane, (trideca-fluoro-1,1,2,2-tertahydrooctyl)dimethylchlorosilane, n-octyldimethylchlorosilane, and n-octadecyldimethylchlorosilane.

Another suitable class of derivatization reagents includes silazanes or disilazanes. Any silazane with at least one reactive group X and at least one alkyl group R, as defined above can be used. A preferred disilazane is hexamethyldisilazane. After derivatizing, the reaction mixture is preferably rinsed in any of the rinsing agents described above, and then dried. Drying can be carried out under any suitable conditions, but preferably in an oven, e.g., for about 2 hr at about 60 C to produce the porous, swellable, sol-gel derived sorbent.

The resulting sol-gel derived sorbent is hydrophobic, resistant to absorbing water, and swellable to at least 1.5 times its volume, when dry, in acetone. Preferred sol-gel derived sorbents are swellable to at least two times their original volume, more preferably at least five times their original volume, most preferably up to about eight to ten times their original volume in acetone. A suitable swellable sol-gel derived sorbent is Osorb® swellable sol-gel derived sorbent available from ABS Materials, Wooster, Ohio.

Without being bound by theory, it is believed that swelling is derived from the morphology of interconnected organosilica particles that are crosslinked during the gel state to yield a nanoporous material or polymeric matrix. Upon drying the gel and following the derivatization step, tensile forces are generated by capillary-induced collapse of the polymeric matrix. This stored energy can be released as the matrix relaxes to an expanded state when a sorbate ligand disrupts the inter-particle interactions holding the dried material in the collapsed state. New surface area and void volume is then created, which serves to further capture additional sorbate ligand that can diffuse into the expanded pore structure.

The sol-gel derived sorbents can be used in any suitable form, including in powder or pellet forms. Powdered forms of the sol-gel derived sorbents are characterized by a high surface area, for example, in the range of about 800 $m^2/g$, which allows for rapid and effective uptake of the sorbate. Depending upon the manner in which grinding of the sol-gel derived sorbents is carried out to obtain the powdered form, the particle sizes may vary widely. Preferred powdered forms will have a high surface area (e.g., about 800 $m^2/g$) and an average particle size that is less than about 250 μm, for example, between about 50 to about 250 μm.

In some embodiments and in particular those embodiments where the sol-gel derived sorbent is in pellet form, the porous swellable sol-gel derived sorbent and the interactive material are combined with a binder, such as a polymeric binder. Useful polymeric binders include microcrystalline cellulose and elastomeric polymers. Preferred elastomeric polymers have a glass transition temperature below about 150 C, the temperature at which the sol-gel derived sorbent begins to decompose. For, example, polystyrene is a currently most preferred elastomeric polymer binder. Other suitable thermoplastic elastomers are described in U.S. Pat. Nos. 7,834,093, 7,799,873, 7,799,868, 7,799,869, 7,790,805, 7,786,206, 7,776,968, 7,771,627, 7,744,781, 7,737,206, 7,655,719, 7,462,309, 6,596,792, 6,162,849, 5,194,480, 7,837,901, 7,815,998, 7,645,399, 7,608,342, 7,550,097, 7,402,616, 6,720,369, 4,634,730, 7,834,093, 7,799,873, 7,799,868, 7,799,869, 7,790,805, 7,786,206, 7,776,968, 7,771.627, 7,744,781, 7,737,206 which patents are herein incorporated by reference.

The amount of binder will depend on the particular application and will be readily determinable by one skilled in the art. In some embodiments, the binder is present in an amount of at least 50% and in some embodiments at least 95% and in some embodiments at least 99.5% based on the weight of the sol-gel derived sorbent.

Pellets can be formed in any desired shape and size suitable for their desired application. For example, in some embodiments, a sol-gel solution is poured into a silicone mold before gellation. The solution is then gelled in the mold to produce a pellet having the desired dimensions.

In other embodiments, pellets are prepared by casting the sol-gel derived sorbent in a die having a desired internal configuration and dimension, which will result in a polymerized sol-gel conforming to the desired size and shape. In such embodiments, the components are combined using any suitable means, such as by combining in a ball mill. The ingredients are then feed into a die using any suitable means such as by using a screw feeder or a gravity feeder. Screw feeders provide the advantage that they crush infeed particles to achieve a more favorable size consistency before compacting. In some cases, heat generated by the screw feeding process may be beneficial, for example, by softening a thermoplastic polymer binder prior to casting.

The ingredients are then compressed at a sufficient force, typically from about 1-8 tonnes, for a sufficient time, typically from about five to about ten minutes, to form a pellet. In some embodiments where the binder is a thermoplastic polymer, the die is preheated to a temperature less than the decomposition temperature of the sol-gel derived sorbent, typically less than about 150 C.

In some embodiments, the sol-gel derived sorbent is disposed on or within a support. Useful supports include any type of solid or semi-solid object capable of directly or indirectly supporting the sol-gel derived sorbent. For example, the support can be any type of container, vessel, or material having at least one surface for supporting the sol-gel derived sorbent. By "directly" it is meant that the sol-gel derived sorbent is in intimate physical contact with at least one support surface. For example, the sol-gel derived sorbent can be attached, bonded, coupled to, or mated with all or only a portion of the at least one surface. By "indirectly" it is meant that the sol-gel derived sorbent is housed by or within the support without being in direct contact with the support. For example, the sol-gel derived sorbent can be afloat in a fluid (e.g., water) that is contained by the support.

In one embodiment of the present invention, the support is a fixed bed reactor (e.g., a packed or fluidized bed reactor) for high flow interaction of the metal-ligand sorbate complex from an aqueous media. The fixed bed reactor contains the sol-gel derived sorbent, in some embodiments encased between two or more layers of a metal or metal alloy (e.g., stainless steel), so that the sol-gel derived sorbent remains stationary or substantially stationary when an aqueous media containing the metal-ligand sorbate complex is flowed through the reactor. The fixed bed reactor can include at least one inlet through which the aqueous medium containing the metal-ligand sorbate complex is supplied, and at least one outlet through which aqueous medium discharged.

The fixed bed reactor can have any shape (e.g., cylindrical), dimensions, and orientation (e.g., vertical or horizontal). The fixed bed reactor may be stand-alone or placed directly in-line with the media containing the sorbate to be removed. In some embodiments, the fixed bed reactor additionally includes an inert, non-swelling filler or media (e.g., ground glass) to provide void spaces for swelling of the sol-gel derived sorbent.

In another embodiment of the present invention, the support is a filter having at least one porous membrane entirely or partially formed with, coupled to, bonded with, or otherwise in intimate contact with the sol-gel derived sorbent. In some embodiments, the filter has a sandwich-like configuration formed of the sol-gel derived sorbent disposed on or embedded between first and second porous membranes. Suitable porous membranes include materials (e.g., metals, metal alloys, or polymers) having pores of sufficient size to permit passage of the sol-gel derived sorbent. For example, the porous membrane can be comprised of a nano- or micro-sized polymers or polymer-blended materials, such as a nano-sized nylon-polyester blends.

In another embodiment of the present invention, the support is a vessel for holding the aqueous medium containing the metal-ligand sorbate complex to be removed. Suitable vessels include stirred tanks or vats. The sol-gel derived sorbent is disposed on or embedded within at least one surface of the vessel. Alternatively, the sol-gel derived sorbent floats or is suspended in aqueous medium containing the sorbate contained within the vessel.

The method can find use in a variety of remediation applications, such as remediation of aqueous streams containing metal particulates produced by petroleum production or other industrial processes. The terms "remediating" and "remediation" can refer to the substantially complete removal of aqueous pollutants (i.e., metal particulates) to achieve the standard(s) set by the responsible regulatory agency for the particular contaminated aqueous media (e.g., National Primary Drinking Water Regulations for subsurface ground water). Other examples of remediation applications can include remediation of sludge containing metal particulates produced by mining operations, remediation of toxic metal particulate products due to the occurrence of a natural disaster, remediation of metal particulates as a result of chemical reactions, and/or remediation of soil contaminated with metal particulates.

The sorbate ligand is contacted with the aqueous solution containing the metal particulate, so that intimate contact is made between the sorbate ligand and the metal particulate to form a metal particulate-sorbate ligand complex. If desired, the mixture can be agitated to facilitate intimate contact between the metal particulate and the sorbate ligand.

The sol-gel derived sorbent is contacted with the aqueous solution containing the metal particulate-sorbate ligand complex so that intimate contact is made between the sol-gel derived sorbent and the metal-ligand sorbate complex. If desired, the mixture, can be agitated to facilitate intimate contact between the sol-gel derived sorbent and the sorbate. Upon contact with the metal-ligand sorbate complex, stored energy in the sol-gel derived sorbent is released as the porous structure relaxes to an expanded state as the sorbate disrupts the inter-particle interactions holding the sol-gel derived sorbent in the unswollen state. New surface area and void volume is then be created, which serves to expose additional sorbate interactive material incorporated in the porous structure. In some embodiments, a supplemental sorbate is added to increase the swelling of the sol-gel derived sorbent and enhance the sorption of the metal-ligand sorbate complex.

The sol-gel derived sorbent is contacted with the metal-ligand sorbate complex until substantially all of the metal-ligand sorbate complex has been sorbed or until the sol-gel derived sorbent has become saturated with the metal-ligand sorbate complex. The metal-ligand sorbate complex can be removed from the aqueous component along with the sol-gel derived sorbent. For example, the sorbent material can be directly removed or collected (e.g., using tactile means) from a support structure or, alternatively, be removed from the aqueous component via centrifugation, filtration or floatation. Removal of the sorbent material leaves behind an aqueous component that is substantially free of the metal particulate. The remaining aqueous component can then be cleanly collected by pouring, aspiration, evaporation, distillation, or other means known in the art.

The sol-gel derived sorbent can sorb essentially all of the metal-ligand sorbate complex in the mixture. If complete removal is desired, the mixture can be contacted with enough of the sol-gel derived sorbent to avoid complete saturation of the sorbent. Alternatively, the mixture can be repeatedly contacted with fresh sol-gel derived sorbent until substantially complete interaction with all the sorbate has been accomplished.

It is an advantage of the inventive composition and process that, in some embodiments, the sol-gel derived sorbent is regenerated or recovered via evaporation, rinse/drying, and/or chemical treatment. For example, the sol-gel derived sorbent can be heated for a period of time and at a temperature sufficient to separate the metal-ligand sorbate complex from the porous structure of the sol-gel derived sorbent. The resulting regenerated sol-gel derived sorbent is then available for additional metal particulate extraction.

EXAMPLES

Stock solutions of iron(II) were prepared from analytical grade ammonium ferrous sulfate in 200 mM acetate buffer pH 5.0. A stock solution of bathophenanthroline (1.2 mg/ml) was prepared in 95% ethanol. Test solutions were prepared by mixing of a 5:1 mole:mole ratio of bathophenantroline:$Fe^{2+}$ at various total concentrations, which in all cases immediately formed a red complex. A 0.5% w/v of a sol-gel derived sorbent (derivatization agent=cyanopropyldimethylchlorosilane) was added to each solution, and the mixture was gently shaken for 4 hr to ensure equilibrium had been achieved. The amount of $Fe^{2+}$-bathoanthroline complex remaining in solution was measured spectrophotometrically at 538 nm ($\lambda$=22, 400 $M^{-1}$ $cm^{-1}$). The amount of total iron (free and complexed) was measured by filtering the swellable sol-gel composition from the solution by a syringe filter and measuring the iron by atomic absorbance spectrometry (limit-of-detection=0.05 ppm). Quantitation was performed by using standard solutions of $Fe^{2+}$ in 200 mM acetate buffer, pH 5.0. The temperature was 25° C. for all measurements.

Extraction of the complex was substantial regardless of initial iron concentration as the percent chelated iron left in solution was measured to lower than the limit of detection (99.9% extraction) (Table 1).

TABLE 1

Percent extraction of [Fe(bathophenathroline)$_3$]$^{2+}$ (L) and concentration of iron (II) remaining in solution versus initial iron (II) concentration

| Concentration $Fe^{2+}$ (total, ppm) | Percent Extraction Fe(L)3 | Concentration $Fe^{2+}$ remaining in solution |
|---|---|---|
| 10 | >99.9% | <0.05 |
| 5.0 | >99.9% | <0.05 |
| 2.5 | >99.9% | <0.05 |
| 1.25 | >99.9% | <0.05 |
| 0.75 | >99.9% | <0.05 |

Iron remaining in solution as free ions was measured by atomic absorbance and in all cases found to be lower than the limit of detection (0.05 ppm). A photo of a 5.0 ppm [Fe (bathophenathroline)$_3$]$^{2+}$ solution before and after addition of the swellable sol-gel composition is shown in FIG. 4.

Hg$^{2+}$ was extracted in the same way using dithizone as the sorbate ligand. The percent extraction was 97%.

From the above description of the invention, those skilled in the art will perceive improvements, changes and modifications. Such improvements, changes, and modifications are within the skill of the art and are intended to be covers by the appended claims.

I claim:

1. A method for extracting a metal particulate from an aqueous solution, the method comprising the steps of:
contacting a sorbate ligand with the aqueous solution containing the metal particulate to form a metal particulate-sorbate ligand complex; and
contacting a sol-gel derived sorbent swellable to at least 1.5 times its volume, with the aqueous solution containing the metal particulate-sorbate ligand complex under conditions effective to cause the sol-gel derived sorbent to sorb the metal particulate-sorbate ligand complex.

2. The method of claim 1, wherein the sorbate ligand has a log K$_{ow}$ of at least about −0.3.

3. The method of claim 2, wherein the sorbate ligand is 4-acyl-pyrazol-5-olate, .beta.-diketones, 8-sulfonamidoquinoline, 1-8-bis(octanesulfonamido)-naphthalene, 2-hydroxy-5nonylbenzophenone, thenoyltrifluoroacetone, cupferron, ketoxime, dicyclohexano-18-crown-6,1,4,8,11-tetrathiacyclotetradecane, and 5-nonylsalicylaldoxime), bathohenanthroline, or dithizone.

4. The method of claim 1, wherein the metal particulate is arsenic, cadmium, chromium, cobalt, copper, nickel, lead, manganese, tin, thallium, mercury or iron.

5. The method of claim 1, further comprising adding a supplemental sorbate to the sol-gel derived sorbent either prior to or during the contacting of sol-gel derived sorbent with the metal particulate-sorbate ligand complex.

6. The method of claim 5, wherein the supplemental sorbate is tetrachloroethylene, ethanol, methanol, acetone, methyl acetate, ethyl acetate, and hexane.

7. A method for extracting a metal particulate from an aqueous solution, the method comprising the steps of:
contacting a sorbate ligand with the aqueous solution containing the metal particulate to form a metal particulate-sorbate ligand complex; and
contacting a sol-gel derived sorbent comprising:
an aromatically-bridged, organosiloxane sol-gel derived composition, containing a plurality of alkylsiloxy substituents, with the aqueous solution containing the metal particulate-sorbate ligand complex under conditions effective to cause the a sol-gel derived sorbent to sorb the metal particulate-sorbate ligand complex.

8. The sorbent material of claim 7, wherein the alkylsiloxy substituents correspond to the formula:

$$—O_x—Si—R_y$$

where R is independently a hydrocarbon containing up to about 30 carbons, x is 1 or 2, y is 2 or 3 and the total of x and y is 4.

9. The method of claim 8, wherein the alklysiloxy substituents include at least one heteroatom selected from sulfur, oxygen, nitrogen, phosphorous or halogen atom or combinations thereof.

10. The method of claim 7, wherein the sorbate ligand has a log K$_{ow}$ of at least about −0.3.

11. The method of claim 10, wherein the sorbate ligand is 4-acyl-pyrazol-5-olate, β-diketones, 8-sulfonamidoquinoline, 1-8-bis(octanesulfonamido)-naphthalene, 2-hydroxy-5nonylbenzophenone, thenoyltrifluoroacetone, cupferron, ketoxime, dicyclohexano-18-crown-6,1,4,8,11-tetrathiacyclotetradecane, and 5-nonylsalicylaldoxime), bathohenanthroline, or dithizone.

12. The method of claim 7, wherein the metal particulate is arsenic, cadmium, chromium, cobalt, copper, nickel, lead, manganese, tin, thallium, mercury or iron.

13. The method of claim 7, further comprising adding a supplemental sorbate to the sol-gel derived sorbent either prior to or during the contacting of sol-gel derived sorbent with the metal particulate-sorbate ligand complex.

14. The method of claim 13, wherein the sorbate is tetrachloroethylene, ethanol, methanol, acetone, methyl acetate, ethyl acetate, and hexane.

15. The method of claim 7 wherein the swellable, aromatically-bridged, organosiloxane sol-gel derived composition is derived from a trialkoxysilane corresponding to the formula:

$$(alkoxy)_3Si—(CH_2)_n—Ar—(CH_2)_m—Si(alkoxy)_3$$

where n and m are individually an integer from 1 to 8, Ar is a single-, fused-, or poly-aromatic ring, and each alkoxy is independently a C$_1$ to C$_5$ alkoxy.

16. The method of claim 15, wherein the trialkoxysilane is a bis(trialkoxysilylalkyl)benzene.

17. The method of claim 16, wherein the bis(trialkoxysilylalkyl)benzene is 1,4-bis(trimethoxysilylmethyl)benzene or bis(triethoxysilylethyl)benzene.

* * * * *